United States Patent
Lister et al.

[11] Patent Number: 6,167,446
[45] Date of Patent: Dec. 26, 2000

[54] AUTOMATICALLY CONFIGURING NETWORK-NAME-SERVICES

[75] Inventors: Robert Lister, San Jose; Joel R. Rigler, Aptos; William M. Pitts; Walter A. Wallach, both of Los Altos, all of Calif.

[73] Assignee: INCA Technology, Inc., Los Altos, Calif.

[21] Appl. No.: 09/185,177

[22] Filed: Nov. 3, 1998

Related U.S. Application Data

[60] Provisional application No. 60/064,105, Nov. 3, 1997.

[51] Int. Cl.$^7$ ................................................ G06F 13/00
[52] U.S. Cl. ...................... 709/223; 709/202; 709/224; 709/225
[58] Field of Search .................................. 709/201, 202, 709/203, 217, 218, 219, 223, 224, 225, 226

[56] References Cited

U.S. PATENT DOCUMENTS

| | | | |
|---|---|---|---|
| 4,422,145 | 12/1983 | Sacco et al. | 395/650 |
| 4,463,424 | 7/1984 | Mattson et al. | 395/463 |
| 4,694,396 | 9/1987 | Weisshaar et al. | 395/200.03 |
| 4,714,992 | 12/1987 | Gladney et al. | 395/600 |
| 4,897,781 | 1/1990 | Chang et al. | 395/600 |
| 4,975,830 | 12/1990 | Gerpheide et al. | 395/200.1 |
| 5,001,628 | 3/1991 | Johnson et al. | 395/600 |
| 5,056,003 | 10/1991 | Hammer et al. | 395/650 |
| 5,058,000 | 10/1991 | Cox et al. | 395/600 |
| 5,077,658 | 12/1991 | Bendert et al. | 395/600 |
| 5,109,515 | 4/1992 | Laggis et al. | 395/650 |
| 5,113,519 | 5/1992 | Johnson et al. | 395/600 |
| 5,133,053 | 7/1992 | Johnson et al. | 395/200.03 |
| 5,155,808 | 10/1992 | Shimizu | 395/200.03 |
| 5,224,205 | 6/1993 | Dinkin et al. | 395/200.02 |
| 5,450,535 | 9/1995 | North | 395/140 |
| 5,513,314 | 4/1996 | Kandasamy et al. | 395/182.04 |
| 5,559,984 | 9/1996 | Nakano et al. | 395/448 |
| 5,611,049 | 3/1997 | Pitts | 395/200.09 |
| 5,649,102 | 7/1997 | Yamauchi et al. | 345/200.03 |
| 5,680,571 | 10/1997 | Bauman | 395/449 |
| 5,729,689 | 3/1998 | Allard et al. | 709/228 |
| 5,754,938 | 5/1998 | Herz et al. | 455/4.2 |
| 5,754,939 | 5/1998 | Herz et al. | 455/4.2 |
| 5,835,087 | 11/1998 | Herz et al. | 345/327 |
| 5,852,717 | 12/1998 | Bhilde et al. | 395/200.33 |
| 5,956,391 | 9/1999 | Melen et al. | 379/114 |
| 5,995,999 | 11/1999 | Bharadhwaj | 709/200 |
| 6,070,191 | 5/2000 | Narendran et al. | 709/226 |

Primary Examiner—Viet D. Vu
Attorney, Agent, or Firm—Donald E. Schreiber, Esq.

[57] ABSTRACT

Generally a computer network includes a file server (22), a network (26), and several client workstations (24). Specific network software provides a name server ("NS") (122) to resolve network-name requests. The computer network can also include a proxy for a network service, e.g. a network infrastructure cache (72) that stores files copied from the server (22). Automatic network-name-services configuration adds to this:

1. a traffic-monitor module (132) that identifies shared network services, and collects service use data;
2. a dynamic redirection service ("DRS") module (126) that receives the collected data, extracts therefrom pairs of client workstations (24) and services, employs a performance metric to order those pairs, and compiles a list (138) of workstations (24) and services that are assigned to the proxy; and
3. a name resolution filter ("NRF") module (136) that, receives the list (138) and network-name-resolution requests, and, when enabled by the list, resolves requests by sending network addresses for the proxy to client workstations (24). cm 1

17 Claims, 6 Drawing Sheets

AUTOMATICALLY CONFIGURING NETWORK-NAME-SERVICES

CLAIM OF PROVISIONAL APPLICATION RIGHTS

This application claims the benefit of U.S. Provisional Patent Application No. 60/064,105 filed on Nov. 3, 1997.

BACKGROUND OF THE INVENTION

1. Field of the Invention

The present invention relates generally to the technical field of digital computer networking and, more particularly, to configuring network-name-services as may be required for effectively employing proxy file caches such as a network-infrastructure cache.

2. Description of the Prior Art

A significant expense in the implementation of computer networks, both local area networks ("LANs") and wide area networks ("WANs") occurs in administering the network infrastructure. As computer networks become more complex and distributed, the costs associated with administering the network infrastructure increase. A network appliance is a device which may be installed on a computer network, and which provides a network service with minimal administration, much like a home appliance. Consequently, using network appliances reduces the costs of administering the network infrastructure.

A network-infrastructure cache is a network appliance which provides a proxy cache for file data that is stored on a remote server. In principle, the network-infrastructure cache provides proxy file caching to a plurality of client workstations concurrently requesting access to file data stored on one or more servers. Thus, the network-infrastructure cache avoids accessing the remote source file server in responding to a user's request for file data. Patent Cooperation Treaty ("PCT") International Patent Application PCT/US92/04939 filed Jun. 3, 1992, entitled "System for Accessing Distributed Data Cache Channel at Each Network Node to Pass Request and Data," and U.S. Pat. No. 5,611,049 that issued Mar. 11, 1997, on a patent application claiming priority therefrom ("Distributed Data Cache patent"), disclose a system capable of performing the functions a network-infrastructure cache. More specifically, FIG. 3 in the Distributed Data Cache patent, together with the text in the Distributed Data Cache patent describing that FIG., discloses a system that is capable of performing the functions of a network-infrastructure cache. The PCT patent application and issued United States patent identified above are hereby incorporated by reference.

To access a file that is stored on a remote server, using a sequence of network packets a client workstation sends a request to the computer which stores the file ("source file server"). Data in the packets specify a particular file to be opened, and include parameters describing how the file will be accessed, e.g. reading, writing, or both. Some file access protocols lack an explicit open request. Instead, such file access protocols establish a connection to the file merely by sending requests to the source file server to read or to write the file. In such protocols, an open request is implicit in the first read or write request packet. And a close request may be assumed if the client workstation has not read or written the file for some specified interval of time. In addition to reading or writing a file, a client workstation may request from a source file server information about the attributes of a file, such as the time it was last written, or who has permission to access the file. If data requested by the client workstation is available at the source file server and if the client workstation is permitted to access requested data, the source file server responds to the request by transmitting the requested data back to the client workstation via the network.

Using conventional network techniques, enabling a client workstation to use the network-infrastructure cache rather than a more remote source file server requires redirecting the client workstation, either directly or using network services, to request file data from the network-infrastructure cache rather than directly from the source file server. In general, preparing a client workstation for using shared network resources requires performing a process on each individual client workstation during which the client workstation both discovers what shared resources are available on the network, and learns the identity of the computer at which each such shared resource is located. This process for preparing a client workstation for using shared network resources is frequently referred to as network-name resolution.

NetBIOS is a network communications standard used for network-name resolution which defines how a computer's name may be presented for translation. NetBIOS performed using the TCP/IP protocol, as defined by Request for Comment ("RFC") 1001 and RFC 1002 of the Internet Engineering Task Force, is one of the network standards used by Microsoft for Windows networks. To achieve network-name resolution in accordance with RFC 1001 and 1002, the client workstation transmits a NetBIOS resolution ("NBT") request onto the network.

Microsoft Windows networks that perform NetBIOS network-name resolution preferably include a NetBIOS Name Server ("NS"). The NetBIOS NS can perform network-name resolution using four alternative techniques, i.e. broadcast, Windows Internet Naming Service ("WINS"), Domain Naming System ("DNS") or a LMHOSTS file. (Note that the LMHOSTS file, which is a list of names and their corresponding network addresses, requires manual administration, and is therefore not used in networks of any significant size. Note also that operating systems other than Microsoft Windows provide analogous ways to perform network-name resolution.) A Microsoft Corporation publication called "The Windows NT Networking Guide," that is part of the Microsoft Windows NT Resource Kit published by Microsoft Press, explains in detail how these various naming services work. The Windows NT Networking Guide is accordingly hereby incorporated into by reference as though fully set forth here.

To obtain network addresses for network-name resolution by broadcasting, a technique that is frequently identified by the name B-Node, a client workstation broadcasts an NBT request containing the computer name. The named computer, or a name service proxy, responds to the NBT request with its network address. In this way responsibility for translating computer names to network addresses is distributed among all computers included in the network. The B-Node technique works well for small networks, but generates an excessive amount of network traffic for use in large networks.

For an alternative network-name resolution technique that permits point-to-point network-name resolution, a technique that is frequently identified by the name P-Node, all computers on the network record a network address of a NetBIOS name server computer. A client workstation then sends an NBT request containing the computer name to the Net- Bios name server computer. If the NetBIOS name server computer recognizes the requested computer name, it responds to the NBT request by transmitting the network address of the named computer back to the requesting client workstation. If the requesting client workstation does not receive a reply from the NetBIOS name server, it may then attempt to obtain the network address of the named computer using a fallback technique such as B-Node. Alternatively, the client workstation may return an error to the client process that has asked for resolution of the named computer's network address. Microsoft Windows networks implementation of network-name resolution, i.e. NetBIOS NS, receives NBT requests at a well known User Datagram Protocol ("UDP") port 137.

As is readily apparent from the preceding description of network-name resolution, employing, in a conventional manner, the network-infrastructure cache for efficiently and effectively responding to requests for file access from client workstations involves a significant amount of network administrative effort. First, configuring the network-infrastructure cache to provide proxy file caching requires creating a different alias name for each remote file server for which the network-infrastructure cache provides proxy file caching. Each such alias name must be stored within the network-infrastructure cache so it can appear to each of the client workstations on the network as a file server having the alias name. In addition to creating an alias name, the network-infrastructure cache must be configured to cache specific files stored on the remote file server. Moreover, applying conventional network administration techniques to the network-infrastructure cache requires additional significant ongoing administrative effort to ensure that proxy file caching provided by the network-infrastructure cache effectively reduces network traffic, and provides improved network response to requests for file access issued by client workstations.

BRIEF SUMMARY OF THE INVENTION

The present invention provides automatic configuration for proxy caches such as network-infrastructure caches.

An object of the present invention is to automatically perform initial configuration and/or ongoing administration of proxy caches such as network-infrastructure caches.

An object of the present invention is to eliminate any need for a network systems administrator to initially configure, and/or to perform ongoing administration of, proxy caches such as network-infrastructure caches.

Briefly, in general a network of digital computers includes a source file server that stores a file, and a network that connects to the source file server. Via the network the source file server receives network-file-services-protocol requests for access to the file, and responds to network-file-services-protocol requests for access to the file by sending via the network a copy of at least some portion of the file. The network of digital computers also includes a client workstation that also connects to the network. The client workstation sends, via the network, a network-file-services-protocol request to access the file that is stored at the source file server, and receives a network-file-services-protocol response to the network-file-services-protocol request to access the file.

Certain digital computer networking software such as Windows NT Server includes a name server ("NS") that receives from the network network-name-resolution requests sent from the client workstation for network-name resolution, and responds to network-name-resolution requests for network-name resolution by sending network addresses to the client workstation via the network. Certain digital computer networks, such as the computer networks described in the PCT patent application and issued United States patent identified above, also provide a proxy file cache that is also connected to the network. The proxy file cache stores a copy of at least a portion of the file that is stored at the source file server. Accordingly, the proxy file cache receives network-file-services-protocol requests from the client workstation for access to the file that is stored at the source file server, and responds to such network-file-services-protocol requests by sending to the client workstation via the network a copy of at least a fraction of that portion of the file that is stored at the proxy file cache.

Automatic network-name-services configuration in accordance with the present invention adds to such a digital computer network a traffic-monitor module that receives, via the network, network communications which permits the traffic-monitor module to:

1. identify specific resources that the source file server shares, via the network, with the client workstation; and
2. collect data about specific resources that are shared between client workstation/source server pairs.

Automatic network-name-services configuration further includes a dynamic redirection service ("DRS") module that:

1. receives data collected by the traffic-monitor module;
2. extracts from the collected data:
   a. identities of the client workstation and the source file server that form each client workstation/source server pair;
   b. an order for client workstation/source server pairs based upon a performance metric determined from data collected for each client workstation/source server pair by the traffic-monitor module; and
   c. a list of those:
      i. source file servers for which the proxy file cache stores a copy of at least portions of files that are stored at the source file servers; and
      ii. based upon the performance metric determined for each client workstation/source server pair, client workstations for which the proxy file cache is assigned to respond to network-file-services-protocol requests for access to the file.

Automatic network-name-services configuration also includes a name resolution filter ("NRF") module that;

1. receives from the DRS module the list extracted by the DRS module from data collected by the traffic-monitor module;
2. receives network-name-resolution requests sent by the client workstation for network-name resolution before the NS receives the network-name-resolution request; and
3. when enabled by data present in the list, responds to network-name-resolution requests for network-name resolution by sending to the client workstation, via the network, network addresses.

In another aspect the present invention is a network-infrastructure cache that provides proxy file caching for a client workstation requesting access to data stored in a file on a source file server. The network-infrastructure cache, the client workstation and the source file server are interconnected by a network. The client workstation may transmit network-file-services-protocol requests to the source file server via the network, and the source file server transmits network-file-services-protocol responses to the client workstation via the network.

The network-infrastructure cache includes a network interface that connects to the network for providing a hardware and software interface to the network. The network-infrastructure cache receives and responds to network-file-services-protocol requests from the client workstation for file data which the network-infrastructure cache provides proxy file caching through the network interface. The network-infrastructure cache also includes a file-request service-module for receiving via the network interface network-file-services-protocol requests transmitted by the client workstation for file data for which the network-infrastructure cache provides proxy file caching, and for transmitting to the client workstation via the network interface network-file-services-protocol responses to the network-file-services-protocol requests.

The network-infrastructure cache also includes part of the network of digital computers described above, i.e the cache, that stores a copy of at least a portion of the file that is stored at the source file server. In response to network-file-services-protocol requests from client workstations the file-request service-module retrieves data from the cache that is to be included in the network-file-services-protocol responses that the file-request service-module transmits to the client workstation. The network-infrastructure cache also includes a file-request generation-module for transmitting to the source file server via the network interface network-file-services-protocol requests for data specified in network-file-services-protocol requests received by the file-request service-module that is missing from the cache. The file-request generation-module also receives from the source file server network-file-services-protocol responses that include data missing from the cache, and transmits such missing data to the cache for storage therein.

In addition to the network interface. the cache, the file-request service-module. and the file-request generation-module described above, the network-infrastructure cache may also include in one configuration the traffic-monitor module, the DRS module, the NRF module of the network of digital computers described above.

These and other features, objects and advantages will be understood or apparent to those of ordinary skill in the art from the following detailed description of the preferred embodiment as illustrated in the various drawing figures.

DETAILED DESCRIPTION

Figure 1:
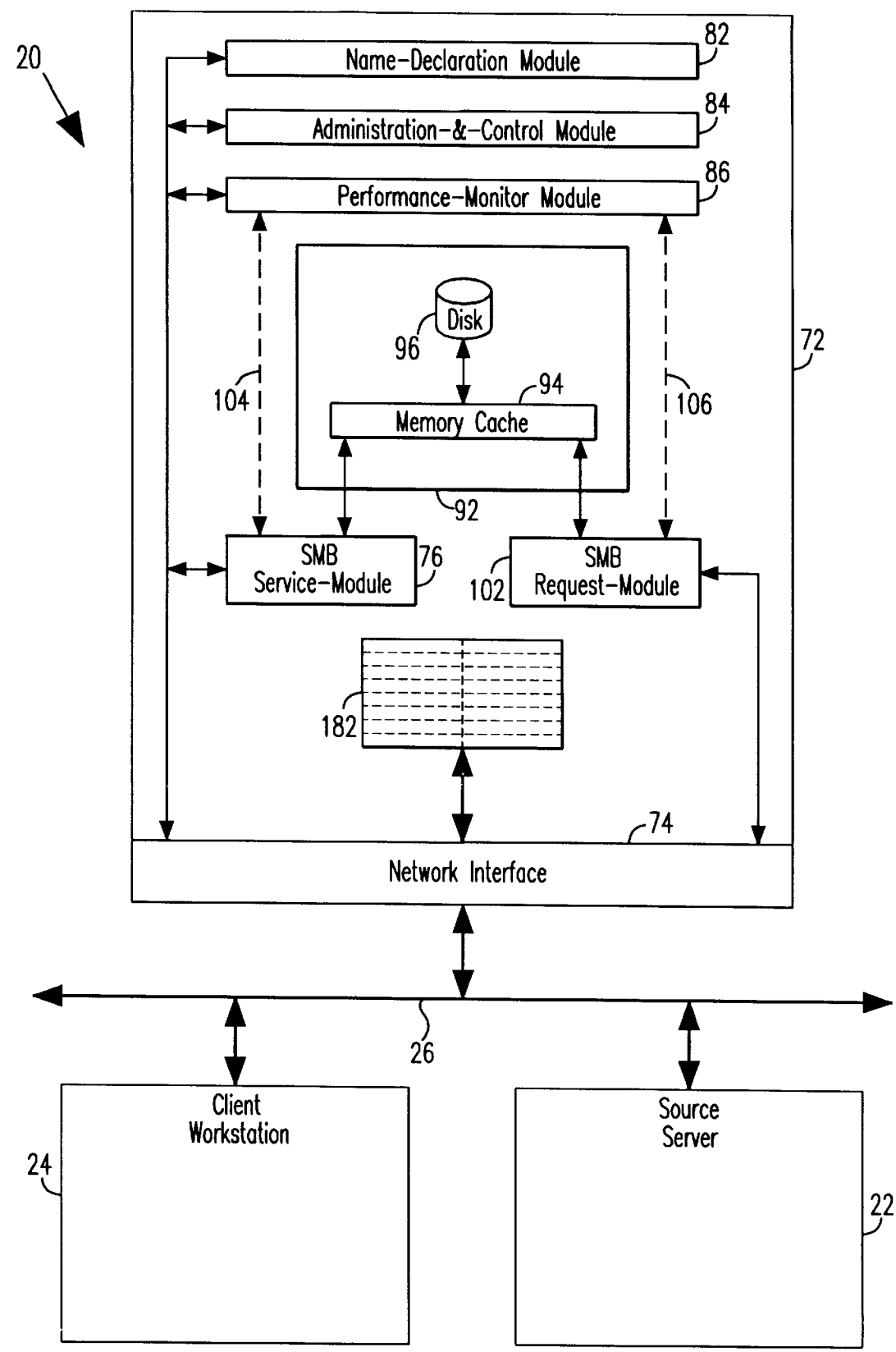
FIG. 1 is a block diagram depicting a digital computer network having a client workstation, a server, and a network-infrastructure cache adapted to operate in accordance with the present invention.

FIG. 1 depicts an illustrative digital computer network, referred to by the general reference character 20, that includes a source file server 22 and a client workstation 24. The source file server 22 and the client workstation 24 communicate with each other via a network 26 that provides a path for bidirectional digital communications. In principle, the digital computer network 20 permits the client workstation 24, as well as any other client workstations, not depicted in FIG. 1, that are connected to the network 26, to exchange file data and or messages with each other, and with the source file server 22. As is well known to those skilled in the art, the network 26 may be provided by local or wide area networks, by virtually any form of telephone communications including analog or digital circuits and leased or dial-up lines, by satellite communications, or by the Internet.

The client workstation 24 and the source file server 22 may communicate with each other using a network-file-services protocol such as Server Message Block ("SMB") Network File System ("NFS®"), Hyper-Text Transfer Protocol ("HTTP"), Netware Core Protocol ("NCP"). For easier understanding, the following description exclusively employs the SMB network-file-services protocol and TCP/IP network protocol for remote file access between the client workstation 24 and the source file server 22 via the network 26. Thus, for purposes of illustration herein the source file server 22 may be understood as running the Windows NT Server operating system while the client workstation 24 may be understood as running the Windows NT Workstation operating system. Those skilled in the art will recognize that other network-file-services protocols such as NFS, HTTP, or NCP, . . . , as well as other network communication protocols such as UDP, or IPX, . . . are functionally equivalent to those identified above. Similarly those skilled in the art will recognize that the network 26 might interconnect the client workstation 24 and the source file server 22 located immediately adjacent to each other, or might interconnect the client workstation 24 and the source file server 22 located half-way around the world from each other.

As described above, to access a file that is stored on the source file server 22, the client workstation 24 sends a request to the source file server 22 via the network 26. Data in the request may specify a particular file to be opened, and include parameters describing how the file will be used, for example for reading or writing, or both. Alternatively, the client workstation 24 may send a request to the source file server 22 requesting information about the attributes of a file, such as the time it was last written, or who has permission to access the file. If data requested by the client workstation 24 is available at the source file server 22 and if the client workstation 24 is permitted to access such data, the source file server 22 responds to the request by transmitting the requested data back to the client workstation 24 via the network 26.

The illustration of FIG. 1 also depicts a specific embodiment of a network-infrastructure cache ("NI Cache") 72. As depicted in FIG. 1, the NI cache 72 connects to the network 26 to provide proxy file caching for the source file server 22. While the following description of the NI cache 72 employs exclusively the SMB network-file-services-protocol, that description of the NI cache 72 is equally applicable to other network-file-services-protocols such as NFS, HTTP or NCP.

The NI cache 72 includes a network interface 74 that provides both a hardware and software interface to the network 26. The software interface receives messages from and transmits messages to the network 26 in accordance with a network communication protocol such as TCP/IP.

The NI cache 72 also includes a SMB service-module 76, a name-declaration module 82, an administration-and-control module 84, and a performance-monitor module 86. If the network interface 74 receives a TCP/IP message from the network 26 addressed to the NI cache 72, or addressed to the source file server 22 for which the NI cache 72 provides proxy file caching, then the network interface 74 de-encapsulates the TCP/IP message and appropriately transmits the de-encapsulated message either to the SMB service-module 76, to the name-declaration module 82, to the administration-and-control module 84, or to the performance-monitor module 86.

The SMB service-module 76 receives and responds to SMB network-file-services-protocol requests from client workstation 24 for access to data from a file stored on the source file server 22. In providing these proxy file caching, the SMB service-module 76 first attempts to retrieve data from a cached image of the file, or a cached image of a portion of the file, that is present in a cache 92 which is included in the NI cache 72. The cache 92 includes a memory cache 94 that is provided by random access memory ("RAM"), or by some other memory technology which provides equivalently rapid access and high speed performance. The cache 92 may also optionally include a hard disk 96, or equivalent technology, which provides lower cost storage than the memory cache 94, and/or which preserves file data if electrical power is removed from the NI cache 72 while exhibiting lesser performance than the memory cache 94.

If a SMB network-file-services-protocol request arrives from the client workstation 24 for file data for which the NI cache 72 provides proxy file caching and all the requested file data is not present at the NI cache 72 either in the memory cache 94 or in the optional hard disk 96, the cache 92 causes a SMB request-module 102 included in the NI cache 72 to transmit via the network interface 74 and the network 26 a SMB network-file-services-protocol request for the missing file data to the source file server 22 that stores the file. The SMB network-file-services-protocol request for file data transmitted by the SMB request-module 102 resembles the SMB network-file-services-protocol request received by the SMB service-module 76 possibly modified to specify the IP network address of the source file server 22 which stores the file, and also possibly modified to fetch only that portion of the file which is missing from the cache 92. After the source file server 22 that stores the file transmits a SMB network-file-services-protocol response containing the requested file data to the SMB request-module 102 via the network interface 74, the SMB request-module 102 transmits such data on to the cache 92 for storage therein. After the missing file data has been stored into the cache 92, the SMB service-module 76 then retrieves the requested file data and transmits a SMB network-file-services-protocol response containing the file data to the requesting client workstation 24.

In response to SMB network-file-services-protocol requests from the client workstation 24 to write data to a file for which the NI cache 72 provides proxy file caching, the NI cache 72 usually stores the file data into either or both the memory cache 94 and the optional hard disk 96, as well as transmitting a SMB network-file-services-protocol request to write the same file data on to the source file server 22 that stores the file. Even though the file data for a write request may be stored locally within the NI cache 72, the SMB service-module 76 usually does not transmit a response to the client workstation 24 until the SMB request-module 102 receives a response from the source file server 22 that the data was received without error. This process of both storing write data locally within the NI cache 72 and transmitting the SMB network-file-services-protocol request on to the source file server 22 that stores the file is referred to as "synchronous writing." Synchronous writing ensures that the NI cache 72 never assumes responsibility for the safety or integrity of file data being written to the source file server 22 that stores the file.

The memory cache 94 preferably employs a least recently used ("LRU") mechanism, but may use some other mechanism, to ensure that the NI cache 72 contains the most recently used file data. As new file data flows into the memory cache 94, the LRU file data is discarded unless the cache 92 includes the optional hard disk 96. If the cache 92 includes the hard disk 96, file data that is being discarded from the memory cache 94 is moved on to the hard disk 96. Storage of file data on the hard disk 96 is also preferably managed on an LRU basis. So, when the memory cache 94 becomes filled to capacity, the LRU file data in the hard disk 96 is discarded as newer file data flows into the hard disk 96.

The administration-and-control module 84 of the NI cache 72 accepts and responds to communications which the NI cache 72 receives from the network 26 specifying an operating configuration for the NI cache 72, e.g. a communication specifying that the NI cache 72 is to provide proxy file caching for files stored on a particular file server such as the source file server 22. The performance-monitor module 86 keeps various statistics that record the performance of the NI cache 72 such as cache hits, i.e. the number of SMB network-file-services-protocol request for which the NI cache 72 found all the requested file data present in the cache 92, and cache misses, i.e. the number of SMB network-file-services-protocol requests for which some or all of the file data was missing from the cache 92. To permit collection of such statistics, the SMB service-module 76 reports cache hits to the performance-monitor module 86 as indicated in FIG. 1 by a dashed line 104, and the SMB request-module 102 reports cache misses to the performance-monitor module 86 as indicated by a dashed line 106. The performance-monitor module 86 also provides the collected statistics via the network 26 to a computer program executed on a client workstation connected to the network 26, such as the client workstation 24, which then displays information about the performance of the NI cache 72.

Configuring the NI cache 72 to provide proxy file caching may include creating a different alias name for each source file server 22 for which the NI cache 72 provides such services. The name-declaration module 82 advertises each such alias name so the NI cache 72 appears to each client workstation on the network 26, such as the client workstation 24, or to any network-name resolution service such as NetBIOS, as a file server having that alias name.

As described thus far, the NI cache 72 is capable of providing proxy file caching for the source file server 22. However, using conventional network techniques to administer the NI cache 72 requires a significant administrative effort to initially configure proxy file caching to use the NI cache 72, and to maintain the configuration of the NI cache 72 in a state in which it continues to effectively reduce network traffic, and provide improved network response to requests for file access issued by the client workstation 24.

Figure 2:
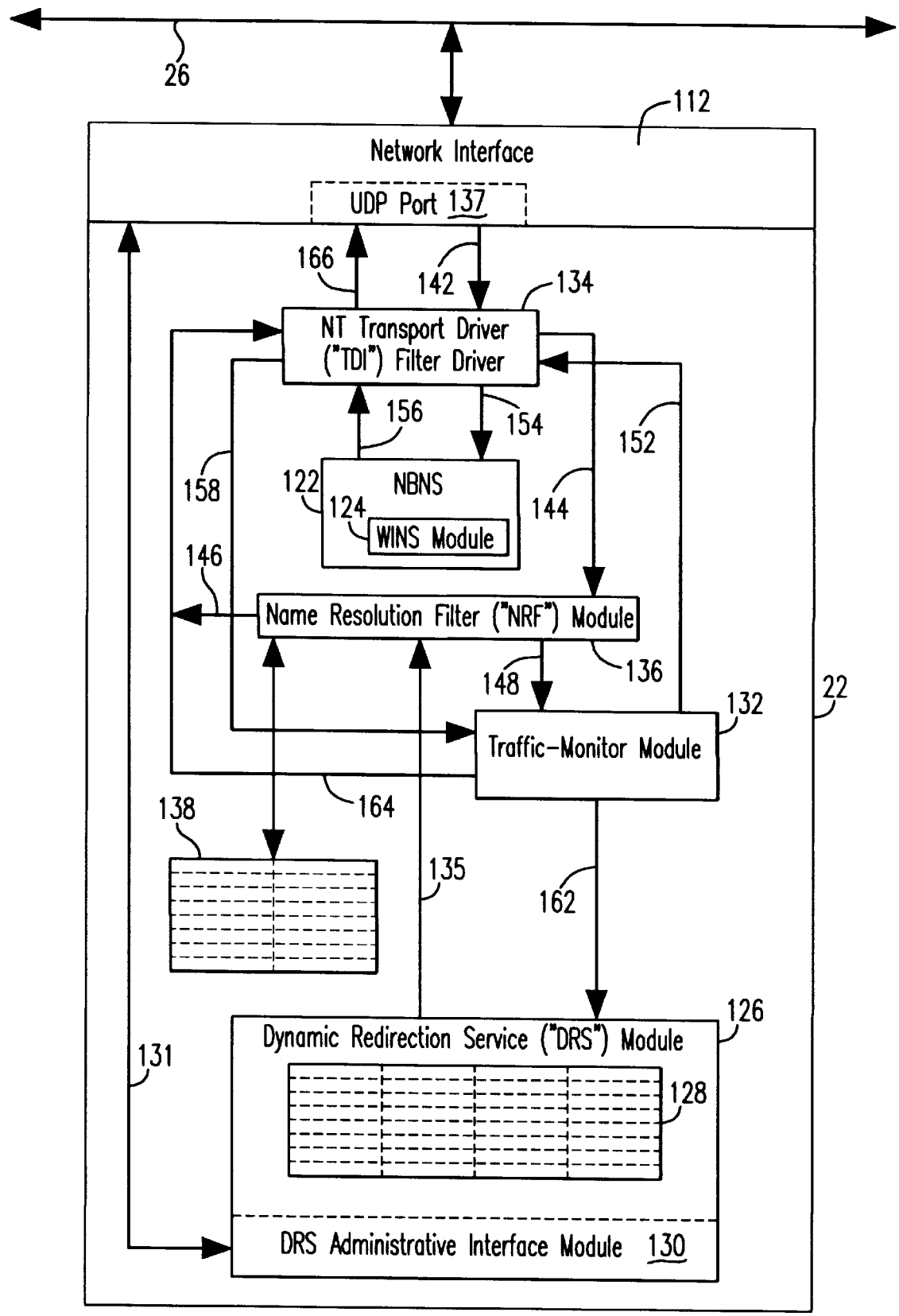
FIG. 2 is a block diagram depicting in greater detail one embodiment of the present invention operating in the source file server depicted in FIG. 1.

FIG. 2, illustrates in greater detail various processes pertinent to the present invention that may, in a particular implementation of the invention, be located within the source file server 22. Accordingly, the source file server 22 includes a network interface 112, analogous to the network interface 74 included in the NI cache 72, that provides both a hardware and software interface to the network 26. As illustrated in FIG. 2, in the instance of the source file server 22 the network interface 112 includes UDP port 137. Moreover, the Windows NT Server operating system running in the source file server 22 includes as a kernel-mode component NetBIOS NS 122, i.e the NETBT.SYS driver. The NetBIOS NS 122 includes a conventional WINS module 124.

In addition to the NetBIOS NS 122, the present invention adapts the source file server 22 for automatically configuring network-name-services using Client Redirection. Accordingly, in addition to the NetBIOS NS 122 the source file server 22 in accordance with the present invention includes a Dynamic Redirection Service ("DRS") module 126. For file system caching, the DRS module 126 identifies those files for which each NI cache 72 is to provide proxy file caching. In general, the DRS module 126 provides a means for identifying those aspects of service which a new appliance or service is to deliver. The DRS module 126 includes a DRS database 128 of redirection rules, a DRS Administrative Interface module 130, and a remote DRS administrator application, that, for example, could run in client workstation 24 or any other computer connected to the network 26. Alternatively, as indicated by an arrow 131 the remote DRS administrator application may run on any workstation or server that can communicate with the source file server 22 via the network 26.

The DRS database 128 contains a set of rules that specify when proxy caches should be activated for which source file servers, or perhaps for other network service providers that furnish network services for objects other than files. The rule structure can be expressed as a tuple, {(Client list)×(Proxy site)×(Alias Name)×(Source)}, illustrated in the table set forth below. Client Lists describe one or more client workstations, either as a single client network address/name, a list of explicit network address/names, or as a subnet mask. For example, the DRS database 128 may specify that all client workstations in a single subnet IP address X.Y.Z.qqq, are to be redirected to use proxy site "Happy" with alias name "Quasimoto" for the source file server 22 at IP address X.Y.R.s with real name "Quasimoto." As described herein, client workstations omitted from the client list in the DRS database 128 are not redirected to any proxy file cache such as the NI cache 72, but always use the real source file server 22.

| Client List | Proxy Site | Alias Name | Source Server |
|---|---|---|---|
| . . . | . . . | . . . | . . . |
| address/name | . . . | . . . | . . . |
| . . . | . . . | . . . | . . . |
| list of address/names | . . . | . . . | . . . |
| . . . | . . . | . . . | . . . |
| subnet X.Y.Z.qqq | Happy | Quasimoto | X.Y.R.s Quasimoto |
| . . . | . . . | . . . | . . . |
| . . . | . . . | . . . | . . . |
| . . . | . . . | . . . | . . . |

The DRS database 128 is used in two ways. In an automatic operating mode, the DRS database 128 will be used directly as compiled by the DRS module 126, and becomes part of the DRS module 126. In an administrator monitored operating mode, the DRS database 128 is viewable and selectively modified via the DRS administrator application, that may run either on the source file server 22, or on a remote client workstation. Network system administrators will then be able to selectively chose to activate, allow, or further limit provision of proxy file service for individual client/proxy/server tuples. The DRS database 128 is preferably maintained both in volatile and in persistent memory, e.g. in RAM, and on disk or in flash memory.

The DRS module 126 builds the DRS database 128 from data collected by a traffic-monitor module 132. The traffic-monitor module 132 collects data about those aspects of service required for proxy file caching in the present environment. For example, for file caching the traffic-monitor module 132 identifies specific resources to be shared, e.g. files, directories, volumes made available by the Microsoft Windows NT Server operating system from the source file server 22 to the client workstation 24 via the network 26. Furthermore, the traffic-monitor module 132 may also monitor other source file servers connected to the network 26 for which proxy file caching may be provided. The traffic-monitor module 132 also identifies those source file servers 22 or other network service providers that are available via the network 26 that are being accessed by client workstations.

The traffic-monitor module 132 supplies the collected data to the DRS module 126 for analysis. The DRS module 126 extracts from the collected data the client workstation and source file server identities and relationships and stores such data into the DRS database 128. Furthermore, the DRS module 126 orders data for the client workstation/source server pairs stored in the DRS database 128 based upon a "performance metric" that is computed as a network performance enhancement indicator. To compute a performance metric, embodiments of DRS module 126 may employ various relationships between the client workstations 24 and network service providers, for example client workstations 24 and source file servers 22, or apply other criteria for ordering the client workstation/object pairs, for example, quality of service, cost of communicating with a source file server, or the demand for access to a source file servers 22 or network service provider that all source file servers 22 present collectively. The DRS module 126 may allow more than one NI cache 72 to provide proxy file caching for the source file server 22 or for another type of network service provider, balancing the load among the proxy file caches in response to observed or anticipated demand and delays detected among the proxy file caches.

One embodiment of the traffic-monitor module 132 described in greater detail below, that operates in a "promiscuous" mode, employs packet monitoring to inspect and collect pertinent data from all packets transmitted across the network 26. From data that the traffic-monitor module 132 collects by packet monitoring, a numerical value, i.e. the performance metric, may be computed for each client workstation/source server pair. The performance metric between a client workstation and source file server may be a function of how much time elapses between a request from the client appearing on the network, and the first reply packet from the source server. Alternatively, the performance metric may be a function of the number of network segments and routers which lie between the client workstation and the source file server, i.e. the number of separate sub-networks a file access request and the reply from the source file server must traverse.

Other factors in addition to average response time may be employed in selecting the NI cache 72 that performs proxy file caching for a particular client workstation 24. In particular, network-file-services requests that originate on one subnet of the network 26 and are directed to remote a source file server 22 on a different subnet are most likely to benefit by having the NI cache 72 provide proxy file caching.

An alternative embodiment of the traffic-monitor module 132 detects likely client workstation/source server pairs from P-Node NBT requests that are addressed to the WINS module 124. In this embodiment, the traffic-monitor module 132 intercepts all client workstation P-Node NBT requests to obtain all server name to network address translations. In this way the traffic-monitor module 132 inspects all NBT requests and responses thereto exchanged between client workstations and the WINS module 124. As part of this monitoring process, the traffic-monitor module 132 compiles a list of all client workstation/source server pairs that experience some delay associated with responding to network-file-services-protocol requests.

This second embodiment of the traffic-monitor module 132 may be implemented using a filter positioned anywhere between client workstations and the NetBIOS NS 122. However, the preferred location for such a filter is immediately adjacent to the NetBIOS NS 122. Thus, in the embodiment depicted in FIG. 2 a Windows NT transport driver interface ("TDI") filter driver 134 is interposed between the UDP port 137, included in the network interface 112, and the WINS module 124. In addition to monitoring all NBT requests, the TDI filter driver 134, located between the network interface 112 and the NetBIOS NS 122, could also easily redirect client workstation file access requests to a proxy file cache by responding to an NBT request addressed to the NetBIOS NS 122 with the network address of the NI cache 72 or some other proxy server.

Lastly, the source file server 22, as adapted for automatically configuring network-name-services, includes a name resolution filter ("NRF") module 136 for directing requests for service to a preferred instance of the service. Responding to requests for network-name resolution service issued by a client workstation 24 the NRF module 136 causes the request to be directed to a preferred provider of the file, e.g. the source file server 22 or the NI cache 72. Using data stored in the DRS database 128, the DRS module 126 computes a list of which source file servers, or other network service providers, are being proxied by which proxy file caches, or other proxies, and which client workstations are being serviced thereby. As indicated by an arrow 135, intermittently the DRS module 126 forwards this list to NRF module 136, which stores the list into a local database 138 for subsequent reference. If the NRF module 136 finds information in the database 138 that permits translating a computer name into a network address, the NRF module 136 replies directly to the NBT request, and does not forward such NBT requests on to the NetBIOS NS 122 which provides the host name service. If the NRF module 136 lacks sufficient information in the database 138 to permit completing the NBT request, the NRF module 136 forwards the NBT request onto the NetBIOS NS 122 which provides the host name service. Thus, as depicted in FIG. 2 the NRF module 136 operates as a filter which attempts to respond to those NBT requests addressed either to the primary NetBIOS NS 122, or to any backup NetBIOS NS 122, which provide network-name resolution service both:

1. for the client workstations which are to receive file data from the proxy file cache provided by the NI cache 72; and
2. for the NI cache 72.

In principle, the NRF module 136 may be located anywhere on the network 26 where the NBT requests may be observed and redirected, for example in a network router.

In the illustration of FIG. 2, the TDI filter driver 134 intercepts the NBT request addressed to the NetBIOS NS 122 at the UDP port 137 as indicated by an arrow 142, and immediately transfers the NBT request to the NRF module 136 as indicated by an arrow 144. If the database 138 provides data sufficient to properly formulate a response to the NBT request, then the NRF module 136 supplies that data including a network address to the TDI filter driver 134 as indicated in FIG. 2 by an arrow 146. However, if the database 138 lacks sufficient data to properly formulate a response to the NBT request, the NRF module 136 forwards the NBT request onto the traffic-monitor module 132 as indicated by an arrow 148. Receipt of the NBT request by the traffic-monitor module 132 activates it for collecting data about aspects of services required for proxy file caching, after which the traffic-monitor module 132 forwards the NBT request onto the NetBIOS NS 122 via the TDI filter driver 134 as indicated by the arrows 152 and 154 in FIG. 2. Upon receiving the NBT request, the NetBIOS NS 122 performs conventional Windows NT name resolution, and then supplies a response to the NBT request to the TDI filter driver 134 as indicated by an arrow 156.

Upon receiving the response to the NBT request from the NetBIOS NS 122, the TDI filter driver 134 forwards the data onto the traffic-monitor module 132 as indicated by an arrow 158 in FIG. 2. Receipt of the response to the NBT request by the traffic-monitor module 132 enables the traffic-monitor module 132 to collect the data required for proxy file caching, and to forward the such data onto the DRS module 126 as indicated by an arrow 162 in FIG. 2. After forwarding the data onto the DRS module 126, the traffic-monitor module 132 forwards the NBT response data, including the network address, onto the TDI filter driver 134 as indicated in FIG. 2 by an arrow 164. Regardless of whether the TDI filter driver 134 receives the NBT response data from the NRF module 136 or from the traffic-monitor module 132, the TDI filter driver 134 then returns the NBT response to the UDP port 137, as indicated by an arrow 166, for transmission to the client workstation 24.

Figure 3:
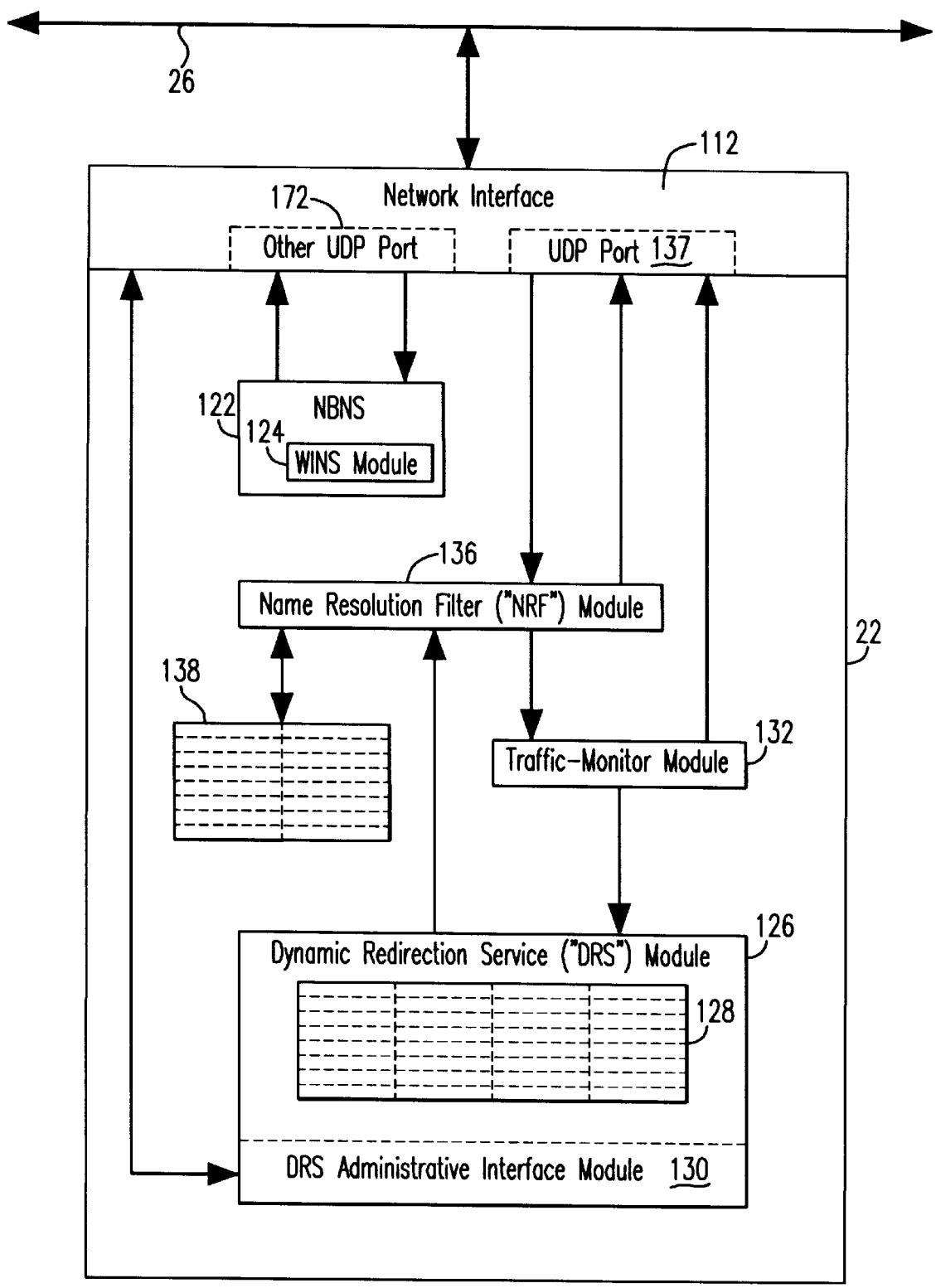
FIG. 3 is a block diagram depicting in greater detail an alternative embodiment of the present invention operating in the source file server depicted in FIG. 1.

Port Mapping, illustrated in FIG. 3, is an alternative technique to the TDI filter driver 134 which may be employed for intercepting NBT requests addressed to NetBIOS NS 122. Port Mapping is a technique that efficiently captures requests made to any service which binds to a particular network socket or port. Port Mapping permits inspecting all requests appearing at a particular operating system port, passing some of the requests on to the conventional operating system service, while directly processing other requests thereby bypassing the conventional operating system service. Port Mapping may be implemented as a user-mode application as contrasted with the TDI filter driver 134 which must be a kernel-mode component.

Enabling a Port Mapping implementation of the present invention as depicted in FIG. 3 requires only a simple TDI filter driver, not illustrated in any of the FIGs., which temporarily attaches its own software function onto the UDP create dispatch function. When the TDI filter's function sees a create I/O Request Packet ("IRP") requesting to bind to UDP port 137, it changes 137 to some other UDP port 172. In this way the simple TDI filter driver forces NetBIOS NS 122 to bind to a port other than UDP port 137. With NetBIOS NS 122 bound to the other UDP port 172, the TDI filter driver task is completed, and it may terminate leaving UDP port 137 free for use by a user-mode application.

When the NetBIOS NS 122 binds to the other UDP port 172, port mapping must be started before the NetBIOS NS 122 provides any network-name resolution service. Thus, the NRF module 136 starts a simple TDI filter and waits for an attempt to attach to UDP port 137. After redirecting an attempt to attach to UDP port 137 elsewhere, the port mapping NRF module 136 starts its own process for listening to UDP port 137. Installed in this way, the port mapping NRF module 136 receives all NBT requests. Some or all of the NBT requests may be forwarded to the NetBIOS NS 122 through the other UDP port 172 to which the NetBIOS NS 122 has been attached. Thus, attaching the NRF module 136 to the UDP port 137 provides a filtering mechanism which is as efficient as can be provided using standard Windows NT APIs, but using simple, reliable user application programming.

In this way, similar to the embodiment depicted in FIG. 2, the NRF module 136 receives all NBT requests for network-name-resolution services provided by the host NetBIOS NS 122. The NRF module 136, traffic-monitor module 132, and DRS module 126 illustrated in FIG. 3 may be implemented as a user mode application or service. Accordingly, arrows in the illustration of FIG. 3, depicts a NBT request propagating from UDP port 137, through the NRF module 136 to the traffic-monitor module 132. If the NRF module 136 resolves the NBT request, it returns the response to UDP port 137. If the NRF module 136 does not resolve the NBT request, the NBT request passes onto the traffic-monitor module 132 which subsequently returns the NBT request to UDP port 137 to be transferred through the other UDP port 172 to the NetBIOS NS 122. The NBT response generated by the NetBIOS NS 122 then returns via the UDP port 137 and the NRF module 136 to the traffic-monitor module 132. This enables the traffic-monitor module 132 to collect the data required for proxy file caching, and to forward the such data onto the DRS module 126.

Figure 4:
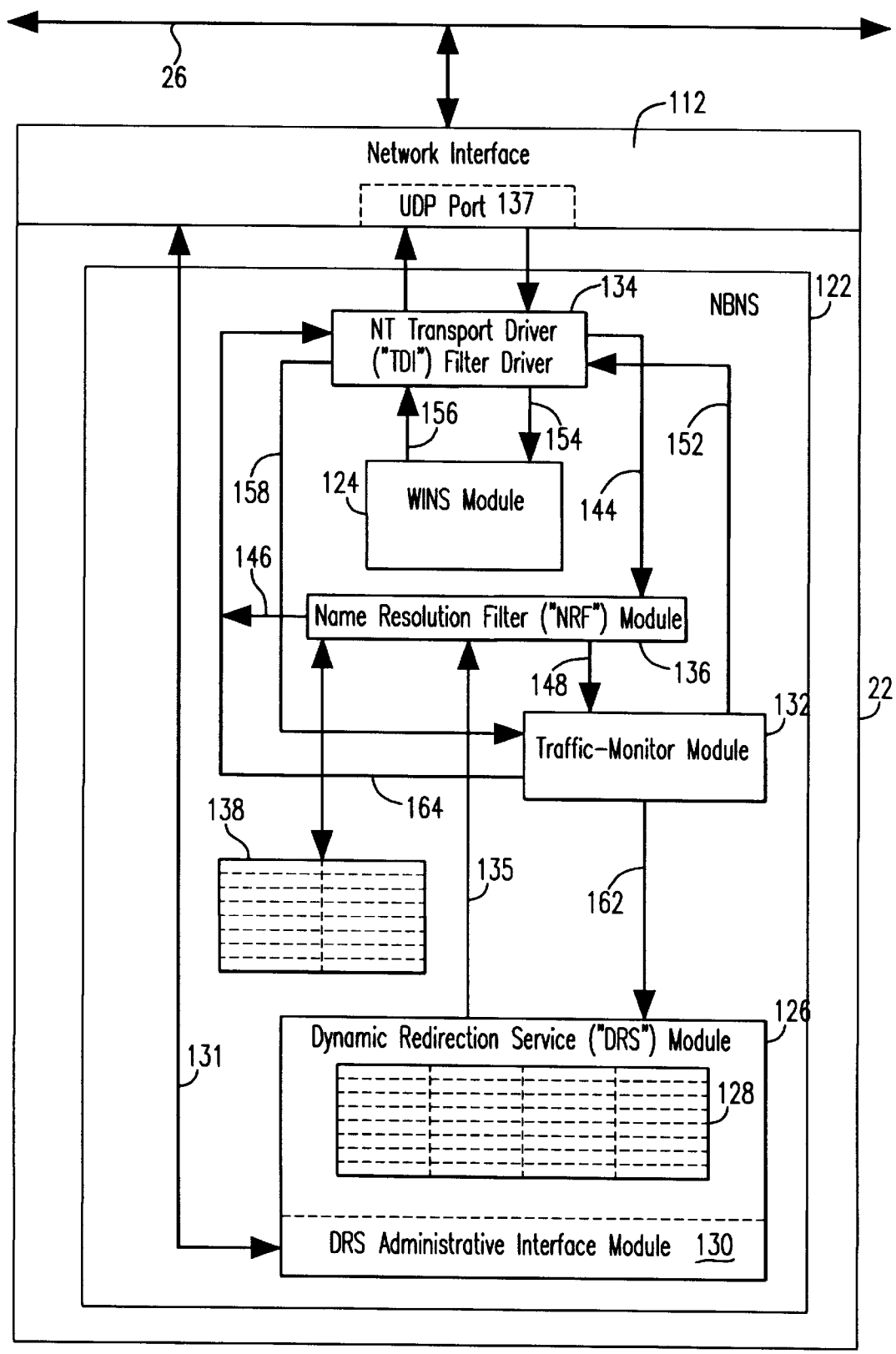
FIG. 4 is a block diagram depicting in greater detail yet another alternative embodiment of the present invention operating in the source file server depicted in FIG. 1.

As described above, using either the TDI filter driver 134 or Port Mapping, the DRS module 126, the traffic-monitor module 132, and the NRF module 136 are independent of, and may be selectively added to the Windows NT source file server 22 to augment the network-name-services functionality provided by the NetBIOS NS 122. FIG. 4 depicts yet another embodiment of the present invention in which all of the functions required for automatically configuring network-name-services are integrated with the NetBIOS NS 122 of the Windows NT source file server 22 to run in kernel-mode. The specific kernel-mode embodiment of the present invention illustrated FIG. 4 augments the NetBIOS NS 122 by adding to the WINS module 124 already included therein the DRS module 126, the traffic-monitor module 132, the TDI filter driver 134, and the NRF module 136. In an embodiment of the present invention such as that depicted in FIG. 4 in which automatic network-name-services configuration is integrated into the NetBIOS NS 122, the list which the DRS module 126 supplies to the NRF module 136 would likely be more effectively utilized if it were supplied directly to the WINS module 124 rather than to the NRF module 136, under which circumstances the NRF module 136 would no longer require the database 138.

Installed in a Windows NT source file server 22 in the various alternative ways illustrated in FIGS. 2–4, the present invention as described thus far is incapable of acquiring network statistics needed to evaluate the "performance metric." However, Microsoft in its Windows NT server as well as other software vendors offer network service computer programs that a network system administrator can install on any client workstation 24 connected to the network 26, or on all of them, to monitor performance of the network 26. Such network service computer program is not separately illustrated in any of the FIGs. Specifically, Windows NT's includes an installable network traffic monitoring program, called Network Monitor Agent, which runs in the client workstations 24 and gathers network information and statistics from the client workstation's interface to the network 26. The Network Monitor Agent is queried by remote Windows NT Server systems running the Microsoft Network Monitor to monitor another portion of the network 26, even a portion of the network 26 in which a router is interposed between the source file server 22 and the client workstation 24. The Network Monitor Agent installed in the client workstation 24 monitors traffic at the remote interface, or on a segment of the network 26. Moreover, the Network Monitor Agent running on the client workstation 24 may be configured to collect only prespecified statistics, and to report the collected statistics to another client workstation 24 connected to the network 26, or to the source file server 22. Accordingly, adroit exploitation of functions provided by the Network Monitor Agent and the network 26 permits either the traffic-monitor module 132 or the DRS module 126 to collect the performance metric statistics which the DRS module 126 requires to prepare the list supplied to the NRF module 136, and stored in the database 138.

There exist various alternative ways in which the functionality required for automatically configuring-network-name services may be integrated with the NetBIOS NS 122 of the source file server 22 to run in kernel-mode in addition to those illustrated in FIGS. 2 and 4. Analogously, there also exist various alternative ways in which the functionality required to implement the present invention may added to the source file server 22 to operated as a user-mode application in addition to the Port Mapping technique illustrated in FIG. 3. Architectures for such alternative embodiments of the present invention, in addition to those illustrated in FIGS. 2–4, depend upon specific details of the operating system running in the source file server 22, upon specific details of the NetBIOS NS 122, and/or upon specific details of equivalent operating systems other than Windows NT Server.

Configuration of a New Proxy File Cache

When a NI cache 72 is first attached to the network 26, it will not have any source file server 22 for which it provides proxy file caching, and the DRS module 126 is unaware that the NI cache 72 is now present on the network 26. To announce its presence to the DRS module 126, the NI cache 72 first obtains a network address for the DRS module 126 by broadcasting a network-name resolution request for the DRS module 126 onto the network 26. Alternative methods for locating the DRS module 126 include sending, via the network 26, a request to a known network address which responds with the network address of the DRS module 126, or by sending a NBT request for the address of the DRS module 126 to the NetBIOS NS 122. The NI cache 72 then, using either network communications or application programming interface ("API") calls, registers with the DRS module 126. By registering with DRS module 126, the NI cache 72 announces its availability, provides information about itself and its capabilities, and inquires about what source file servers 22 or other network service providers it may provide caching services. Subsequently the DRS module 126 transmits a message to the NI cache 72 (e.g., as a sequence of network packets, or via a return from an API call) containing a list of source file servers 22 and/or network service providers which have been assigned to the new proxy cache, together with the network address of the source file server 22 and/or network service providers for which the NI cache 72 is to provide proxy file caching. At the same time, DRS module 126 sends a message to NRF module 136, containing the new assignments for the client workstations 24, NI cache 72, and source file servers 22.

The NI cache 72 takes the information provided by the DRS module 126 and initializes a local source server proxy map 182, illustrated in FIG. 1, which specifies those source file servers 22 for which the NI cache 72 is to provide proxy file caching. Note that when proxy file caching for a specific source file server 22 is initially assigned to the NI cache 72, no client workstation 24 will be yet transmitting network-file-services-protocol requests to the NI cache 72 instead of the source file server 22 for which the NI cache 72 provides proxy file caching.

Dynamic Reconfiguration

From time to time, the DRS module 126 may detect changes in network performance, network load, or the load on a particular source file server 22 or other network service provider. Either automatically, or through a human network system administrator using the DRS Administrative Interface module 130, proxy caching assignments are then revised. When such a revision occurs, the DRS module 126 sends a message to the NI cache 72 containing modified caching configurations. These modifications may add new source file servers 22 to the proxy file caching assignments of the NI cache 72, or remove one or more source file servers 22 from the proxy file caching assignments. For example, a source file server 22 may no longer need the assistance of proxy file caching, or another NI cache 72 may have been reassigned to provide proxy file caching for that particular source file server 22. At the same time, DRS module 126 sends a message to NRF module 136 containing the new assignments for the client workstations 24, NI cache 72, and source file servers 22. The NRF module 136 uses this information to change the way it assigns proxies to clients upon receiving subsequent NBT requests for network-name resolution.

Since dynamic reconfiguration may occur at any instant, immediately following reconfiguration the NI cache 72 will initially be committed to providing proxy file caching for client workstations 24 and source file servers 22 that may be different from those specified by the reconfiguration. When that occurs, to maintain network performance the NI cache 72 should not arbitrarily cease providing proxy file caching to those client workstations 24 for which it is no longer assigned to provide proxy file services. Similarly, the NI cache 72 should not erase data cached for source file servers 22 for which it is no longer to provide proxy file caching. The DRS module 126, the NRF module 136 and the NI caches 72 must continue communicating until all client workstations 24 being serviced by the NI cache 72 have been redirected elsewhere to receive proxy file caching. Only then will it safe to purge information about the source file servers 22 for which the NI cache 72 no longer provides proxy file caching from the proxy cache's source server proxy map 182.

In one embodiment, the client workstations 24 migrate to new NI caches 72 to access files from a specific source file server 22 upon subsequently submitting an NBT request to the NetBIOS NS 122 seeking network-name resolution for the source file server 22. A NBT request arriving at the NRF module 136 immediately after a reconfiguration occurs receives the network address of the NI cache 72 most recently assigned to provide proxy file caching for a specific source file server 22. For the discontinued NI cache 72, which is no longer provides proxy file caching for that source file server 22, cached data eventually becomes replaced with active data being cached for a different source file server 22. Information about the prior proxy file caching assignment for the source file server 22, and the network address of the source file server 22 remains in the source server proxy map 182 until all data cached for that source file server 22 has been LRUed out of the NI cache 72.

Another embodiment of the NI cache 72 could immediately cease responding to network-file-service-protocol requests for data from a discontinued source file server 22. Refusing to provide proxy file caching for the source file server 22 forces the client workstation 24 to reconnect to the source file server 22. Reconnecting to the source file server 22 requires that the NI cache 72 transmit a new NBT request to the NetBIOS NS 122 to which the NRF module 136 responds with the network address of the NI cache 72 that is now assigned to provide proxy file caching for the source file server 22, or with the network address of the source file server 22 if it no longer qualifies for proxy file caching.

Dynamic reconfiguration occurs, for example, when a new NI cache 72 initially connects to the network 26. When that occurs, the DRS module 126 may immediately attempt to determine how best to use the new NI cache 72 by examining the DRS database 128. Several client workstations 24 may have been accessing the same file data either directly or through different proxies, and the DRS module 126 may choose to coalesce proxy file caching for a specific source file server 22 onto the new NI cache 72.

Self-Configuration

Figure 5:
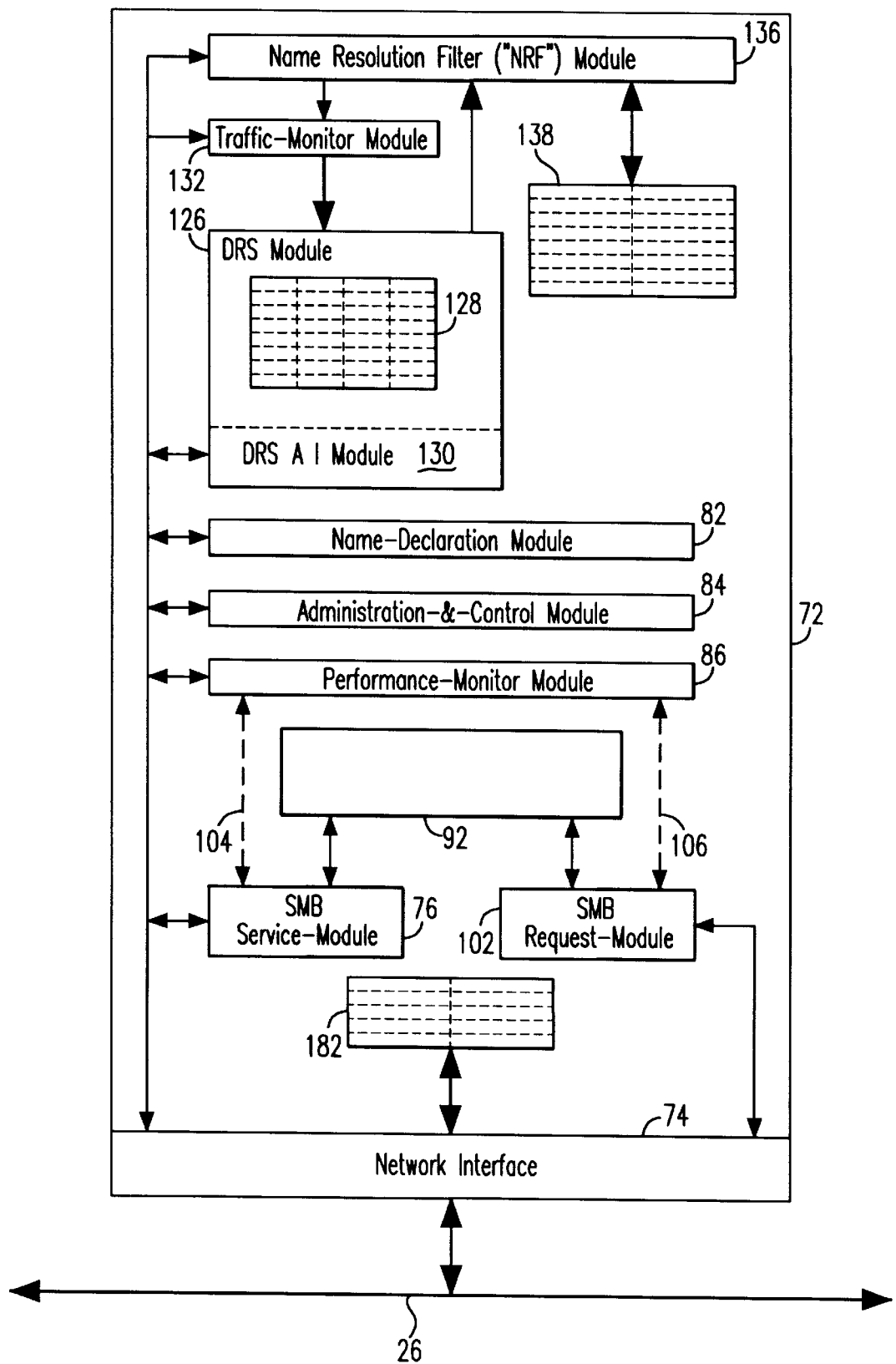
FIG. 5 is a diagram illustrating the network-infrastructure cache of FIG. 1 as modified to provide self-configuration.

Instead of installing the DRS module 126, the traffic-monitor module 132 and the NRF module 136 in the source file server 22, installing them in the NI cache 72, as illustrated in FIG. 5, provides a self-configuring NI cache 72. The NRF module 136 in the self-configuring NI cache 72 operates in the promiscuous mode receiving copies of appropriate network communications from the network interface 74. Specifically, if the network interface 74 runs Windows NT then the network interface 74 preferably includes the Network Monitor Agent, described in greater detail above, configured to promiscuously forward copies of pertinent network communications to the NRF module 136, and/or the traffic-monitor module 132. Thus, for example, a Network Monitor Agent included in the network interface 74 can promiscuously forward to the NRF module 136 data specifying when:

1. a request from the client workstation 24 to access a file stored on the source file server 22 appears on the network 26; and
2. a response to the request from the client workstation 24 sent by the source file server 22 appears on the network 26.

Furthermore, the data promiscuously forwarded to the NRF module 136 by the Network Monitor Agent can also include the computers' network names and network addresses both for the source file server 22 and for the client workstation 24. In this way, if the database 138 lacks data specifying that the NI cache 72 is to provide proxy file caching for a particular client workstation/source file server pair, the NRF module 136 then forwards the data received from the Network Monitor Agent onto the traffic-monitor module 132 and DRS module 126 for further analysis. Furthermore, if desired to assist in a proper evaluation of the "performance metrics" the Network Monitor Agent can be configured to forward data extracted from certain specified types of network communications directly onto the traffic-monitor module 132.

The NI cache 72 is self-configured for providing proxy file caching as follows:

1. The NI cache 72, that includes the DRS module 126, the traffic-monitor module 132 and the NRF module 136, is attached to the network 26 and power turned on.

2. The NI cache 72 then operating in a promiscuous mode listens to and the traffic-monitor module 132 and DRS module 126 log all network-file-services-protocol requests and responses occurring on the network 26.
3. The DRS module 126 then associates network-file-services-protocol responses with their respective network-file-services-protocol requests, and determines an average response time between network-file-services-protocol requests and network-file-services-protocol responses for each source file server 22.
4. The DRS module 126 then identifies any "slow" remote source file server 22, and selects some (or all) of the "slow" remote source file servers as "needing assistance".
5. For each source file server 22 selected by the DRS module 126, the name-declaration module 82 of the NI cache 72 appropriately modifies the network-name-services such as DNS, WINS, and/or NetBIOS, . . . , such that the IP network address of the NI cache 72 is registered as an IP network address for the selected remote source file server 22.

Subsequently, when, for example, the client workstation 24 queries the NetBIOS NS 122 for the IP network address of the selected NetBIOS NS 122, the client workstation 24 receives a list of IP network addresses that includes the IP network address of the NI cache 72. If the NI cache 72 is connected to the same subnet of the network 26 as the client workstation 24 and the remote source file server 22 is on a different subnet, the client workstation 24 will chose the "closest" IP network address which will be the IP network address of the self-configuring NI cache 72.

As is apparent from the preceding description, the self-configuring NI cache 72 constitutes a network appliance that may be installed on the network 26, and which provides proxy file caching with minimal administration.

Network Capacitors

The NI cache 72 depicted in FIG. 5 may be implemented as a specially modified hard disk 96 that includes all the hardware of the NI cache 72 mounted on the disk drive's electronics board with the network interface 74 replacing the hard disk's conventional interface, e.g. Integrated Drive Electronics ("IDE"), AT Attachment ("ATA"), Small Computer System Interface ("SCSI"), . . . . Such an implementation of the NI cache 72, identified by the name "Network Capacitor," also includes all the software of the NI cache 72 together with real-time operating system software, and all necessary disk drive control software. This software is preferably stored in permanent storage included in such an implementation of the NI cache 72, such as on the hard disk 96 included in the cache 92. The stored software is executed by a microprocessor also mounted on the electronics board of the hard disk 96. A RAM also located on the disk-drive's electronics board provides "working space" for the memory cache 94 of the cache 92, and for execution of the software included in the NI cache 72.

A network capacitor implementation of the NI cache 72 may be simply attached to the network of network 26 and forgotten. Such a NI cache 72 automatically configures itself as described above so the client workstation 24 is soon transparently redirected to the NI cache 72, which provides proxy file caching for the source file server 22.

If the proxy file caching becomes unavailable, because it has shutdown, or for some other reason, the NRF module 136 and the NetBIOS NS 122 replace the network address of the NI cache 72 with the network address of the source file server 22, either at the request of the DRS module 126, or through some other recovery process. In this way servicing of network-file-services-protocol requests from the NI cache 72 are uninterrupted because the proceed to the source file server 22 rather than to the NI cache 72.

The present invention in one embodiment envisions primary and backup DRS modules 126, traffic-monitor modules 132 and NRF modules 136 that correspond and are located with primary and backup NetBIOS NS's 122 provided by Windows NT Server. Each WINS Scope (a group of clients and servers which all share the same WINS primary and backup servers) are served by the same primary and backup DRS modules 126, traffic-monitor modules 132 and NRF modules 136. Such a configuration of the present invention with replication of the DRS database 128 and database 138 avoids a single point failure of automatic network-name-services configuration. In other embodiments, the DRS modules 126, traffic-monitor modules 132 and NRF modules 136 may be located anywhere on the network 26 where NBT requests may be observed, for example in a network router 192 such as that illustrated in FIG. 6.

Figure 6:
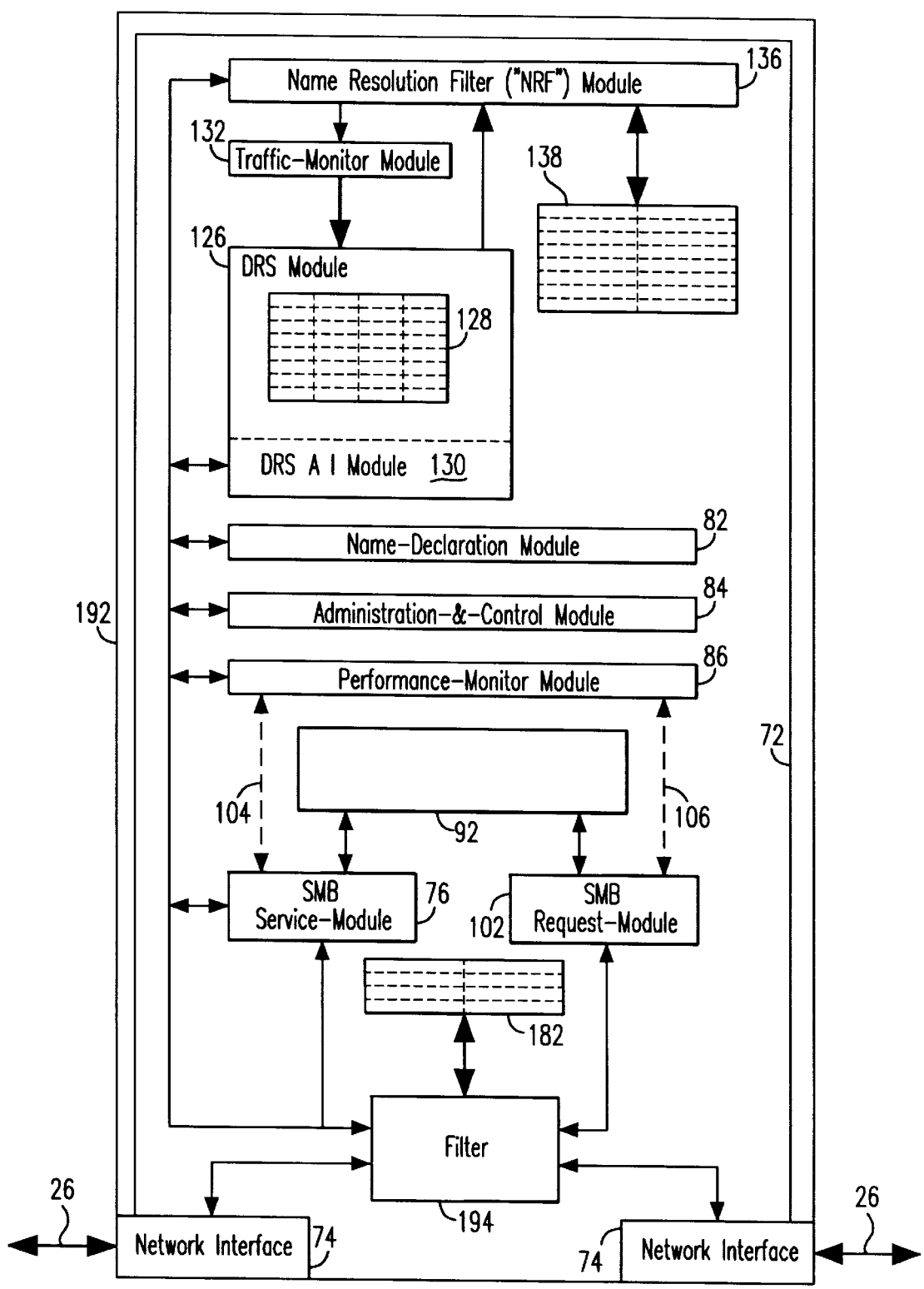
FIG. 6 is a block diagram depicting the network-infrastructure cache as illustrated in FIG. 5 incorporated into a network router that facilitates both automatic network-name-services configuration, and inline filtering of network-file-services-protocol requests.

The network router 192 interconnects at least two networks 26 that use a single network layer protocol, but may respectively use different data link layer and physical layer procedures. As depicted in FIG. 6, the network router 192 inherently includes as many network interfaces 74 as there are networks 26 connected to the network router 192. The network router 192 incorporating the NI cache 72 also includes a filter 194 through which all IP protocol messages pass. Thus in the implementation depicted in FIG. 6, the filter 194 appropriately redirects all network-file-services-protocol requests addressed for the source file server 22 to the SMB service-module 76. And the filter 194 also appropriately redirects all network-file-services-protocol responses from the remote file source file server 22 for which the NI cache 72 provides proxy file caching to the SMB request-module 102. All network-file-services-protocol requests and responses that are not redirected to the NI cache 72 by the filter 194 flow through the network router 192 unimpeded toward their respective destinations. Analogous to inclusion of the NI cache 72 in the network router 192, the NI cache 72 may also be included in a network hub that is not separately illustrated in any of the FIGs.

Router Redirection is a technique that permits network-file-services-protocol requests sent by client workstations 24 to specify the IP address of the source file server 22 which stores the file. However, if the network-file-services-protocol request passes through a network router 192 that provides Router Redirection, such as network routers offered by Cisco Systems of San Jose, Calif. that supports "Transparent Proxy" services, as specified by routing table data supplied to the network router 192 by a network system administrator, a media access control ("MAC") address of the network-file-services-protocol request may be changed to that of the NI cache 72. Thus, a network system administrator can configure network router 192 which support Transparent Proxy services to redirect network-file-services-protocol requests onto the NI cache 72. However, if the NI cache 72 adapted for automatically configuring network-name-services is not located in a network node through which all network-file-services-protocol requests and responses flow, then Client Redirection as described above in connection with FIGS. 2–4 must be used to properly implement automatic network-name-services configuration for proxy file caching.

Although the present invention has been described in terms of the presently preferred embodiment, it is to be understood that such disclosure is purely illustrative and is not to be interpreted as limiting. Consequently, without departing from the spirit and scope of the invention, various alterations, modifications, and/or alternative applications of the invention will, no doubt, be suggested to those skilled in the art after having read the preceding disclosure. Accordingly, it is intended that the following claims be interpreted as encompassing all alterations, modifications, or alternative applications as fall within the true spirit and scope of the invention.

What is claimed is:

1. In a network of digital computers that includes:
   A. a network;
   B. client workstations that connect to the network for exchanging network communications between the client workstations; and
   C. a name server ("NS") that:
      i. receives from the network network-name-resolution requests sent by client workstations for network-name resolution; and
      ii. responds to network-name-resolution requests by sending to the requesting client workstation, via the network, a network address;
   an automatic network-name-services configuration improvement comprising:
   D. a traffic-monitor module that receives, via the network, network communications which permits the traffic-monitor module to:
      i. identify specific network resources that are shared by client workstations connected to the network; and
      ii. collect data about network resources that are shared by the client workstations;
   E. a dynamic redirection service ("DRS") module that:
      i. receives data collected by the traffic-monitor module; and
      ii. extracts from the collected data:
         1) identities of the client workstations and network resources that form client workstation/network resource pairs;
         2) an order for client workstation/network resource pairs based upon a performance metric determined from data collected for each client workstation/ network resource pair; and
         3) a list of:
            A) proxy servers that can provide a proxy service for network resources; and
            B) based upon the performance metric determined for each client workstation/network resource pair, at least one client workstation for which the proxy server is assigned to provide the proxy service; and
   F. a name resolution filter ("NRF") module that:
      i. receives from the DRS module the list extracted by the DRS module from collected data;
      ii. receives network-name-resolution requests sent by client workstations for network-name resolution before the NS receives the network-name-resolution request; and
      iii. when enabled by data present in the list, responds to network-name-resolution requests by sending to the requesting client workstation, via the network, the network address of the proxy server specified by the list.

2. The network of digital computers of claim 1 wherein the network resource is a source file server which stores a file that is shared by the client workstations, the client workstations:
   i. sending, via the network, network-file-services-protocol requests to access the file; and
   ii. receiving, via the network, network-file-services-protocol responses to network-file-services-protocol requests to access the file; and
   wherein the network of digital computers further includes:
   G. a proxy file cache, also connected to the network, that, by storing a copy of at least a portion of the file stored at the source file server, is the proxy server for the network resource, the proxy file cache:
      i. receiving, via the network, network-file-services-protocol requests from client workstations for access to the file that is stored at the source file server; and
      ii. responding, via the network, to network-file-services-protocol requests from client workstations for access to the file by sending to the requesting client workstation a copy of at least a fraction of that portion of the file that is stored at the proxy file cache.

3. The automatic network-name-services configuration improvement of claim 2 wherein the traffic-monitor module, the DRS module, and the NRF module are all located at the source file server.

4. The automatic network-name-services configuration improvement of claim 2 wherein the performance metric determined by the DRS module depends upon time that elapses between a network-file-services-protocol request from the client workstation appearing on the network, and the network-file-services-protocol response from the source file server thereto appearing on the network.

5. The automatic network-name-services configuration improvement of claim 1 wherein the DRS module extracts tuples from data received from the traffic-monitor module.

6. The automatic network-name-services configuration improvement of claim 1 wherein the DRS module includes an administrative interface that permits an administrator to selectively modify assignment of network resources for which proxy servers are to provide proxy services.

7. The network of digital computers of claim 1 wherein the traffic-monitor module included in the automatic network-name-services configuration improvement receives network communications from a filter through which:
   network-name-resolution requests for network-name resolution sent by the client workstation pass before such network-name-resolution requests are received by the NS; and
   network addresses from the NS sent in response to network-name-resolution requests for network-name resolution pass before such network addresses are received by the client workstation.

8. The network of digital computers of claim 1 wherein the network of digital computers further includes:
   G. a pre-established port:
      i. to which the client workstation addresses network-name-resolution requests for network-name resolution; and
      ii. from which the client workstation receives network addresses sent in response to network-name-resolution requests for network-name resolution; and
   wherein before the NS receives from the pre-established port network-name-resolution requests for network-name resolution, the automatic network-name-services configuration improvement causes the NS to be redirected to an other port from which the NS thereafter:

i. receives network-name-resolution requests for network-name resolution, and ii. sends network addresses in response to network-name-resolution requests for network-name resolution; and wherein the traffic-monitor module included in the automatic network-name-services configuration improvement receives from the pre-established port network communications that contain:

network-name-resolution requests for network-name resolution sent by the client workstation before such network-name-resolution requests are received by the NS; and network addresses from the NS sent in response to network-name-resolution requests for network-name resolution before such network addresses are received by the client workstation.

9. The automatic network-name-services configuration improvement of claim 1 wherein network communications received by the traffic-monitor module are copies of network communications obtained by promiscuously monitoring all network communications to inspect and collect pertinent data therefrom.

10. A network-infrastructure cache for providing proxy file caching for a client workstation requesting access to data stored in a file on a source file server; the client workstation and the source file server being interconnected by a network via which client workstation may transmit network-file-services-protocol requests to the source file server, and via which the source file server transmits network-file-services-protocol responses to the client workstation; the network-infrastructure cache comprising:

A. a network interface that connects to the network for providing a hardware and software interface to the network through which the network-infrastructure cache receives and responds to network-file-services-protocol requests from the client workstation for data for which the network-infrastructure cache provides proxy file caching;

B. a file-request service-module for receiving via said network interface network-file-services-protocol requests transmitted by the client workstation for data for which the network-infrastructure cache provides proxy file caching, and for transmitting to the client workstation via said network interface network-file-services-protocol responses to the network-file-services-protocol requests;

C. a cache from which said file-request service-module retrieves data that is included in the network-file-services-protocol responses that said file-request service-module transmits to the client workstation;

D. a file-request generation-module for transmitting to the source file server via said network interface network-file-services-protocol requests for data specified in network-file-services-protocol requests received by said file-request service-module that is missing from said cache, for receiving from the source file server network-file-services-protocol responses that include data missing from said cache, and for transmitting such missing data to said cache for storage therein;

E. a traffic-monitor module that receives, via the network, network communications which permits the traffic-monitor module to:

i. identify specific resources that the source file server shares, via the network, with the client workstation; and ii. collect data about specific resources that are shared between client workstation/network resource pairs;

F. a DRS module that:

i. receives data collected by the traffic-monitor module;

ii. extracts from the collected data:

1) identities of the client workstation and the source file server that form each client workstation/network resource pair;

2) an order for client workstation/network resource pairs based upon a performance metric determined from data collected for each client workstation/network resource pair by the traffic-monitor module; and 3) a list of those:

A) source file servers for which the proxy file cache stores a copy of at least portions of files that are stored at the source file servers; and B) based upon the performance metric determined for each client workstation/network resource pair, client workstation for which the proxy file cache is assigned to respond to network-file-services-protocol requests for access to the file;

G. a NRF module that:

i. receives from the DRS module the list extracted by the DRS module from data collected by the traffic-monitor module;

ii. receives network-name-resolution requests sent by the client workstation for network-name resolution before the NS receives the network-name-resolution request; and iii. when enabled by data present in the list, responds to network-name-resolution requests for network-name resolution by sending to the client workstation, via the network, network addresses.

11. The network-infrastructure cache of claim 10 wherein said network interface is included in a network router that interconnects two networks.

12. The network-infrastructure cache of claim 10 wherein said network interface is included in a network hub that interconnects two networks.

13. The network-infrastructure cache of claim 10 wherein said cache includes a memory cache.

14. The network-infrastructure cache of claim 13 wherein said cache includes a disk cache.

15. The network-infrastructure cache of claim 10 further comprising:

H. a Performance-Monitor Module for keeping various statistics that record performance of the network-infrastructure cache; and I. an Administration-and-Control Module for accepting and responding to communications specifying an operating configuration for the network-infrastructure cache.

16. The network-infrastructure cache of claim 15 further comprising:

J. a Name-Declaration Module for informing a NS that the network-infrastructure cache is to provide proxy file caching for the source file server.

17. The network-infrastructure cache of claim 15 further comprising:

J. a Name-Declaration Module for advertising to client workstations on the network that the network-infrastructure cache is to provide proxy file caching for the source file server.

* * * * *